(12) United States Patent
Luo

(10) Patent No.: US 10,749,245 B2
(45) Date of Patent: Aug. 18, 2020

(54) ANTENNA ASSEMBLY, ELECTRONIC DEVICE AND METHOD FOR SWITCHING ANTENNA

(71) Applicant: GUANGDONG OPPO MOBILE TELECOMMUNICATIONS CORP., LTD., Dongguan, Guangdong (CN)

(72) Inventor: Yizhou Luo, Dongguan (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 93 days.

(21) Appl. No.: 16/183,114

(22) Filed: Nov. 7, 2018

(65) Prior Publication Data

US 2019/0229400 A1 Jul. 25, 2019

(30) Foreign Application Priority Data

Jan. 19, 2018 (CN) .......................... 2018 1 0054802
Jan. 19, 2018 (CN) ..................... 2018 2 0099124 U

(51) Int. Cl.
*H01Q 1/24* (2006.01)
*H04B 7/08* (2006.01)
(Continued)

(52) U.S. Cl.
CPC ............... *H01Q 1/243* (2013.01); *H01Q 3/24* (2013.01); *H01Q 5/35* (2015.01); *H01Q 21/06* (2013.01);
(Continued)

(58) Field of Classification Search
CPC .. H01Q 1/24; H01Q 5/35; H01Q 3/24; H01Q 21/06; H01Q 1/28; H01Q 1/48; H01Q 9/42
(Continued)

(56) References Cited

U.S. PATENT DOCUMENTS

2016/0049723 A1* 2/2016 Baks ................. H01L 23/49827
343/848
2016/0240492 A1* 8/2016 Wolter .................. H01L 23/552

FOREIGN PATENT DOCUMENTS

CN 1694367 A 11/2005
CN 101520834 A 9/2009
(Continued)

OTHER PUBLICATIONS

Partial Supplementary European Search Report in the European application No. 18206423.8, dated Apr. 26, 2019.
(Continued)

*Primary Examiner* — Andrea Lindgren Baltzell
(74) *Attorney, Agent, or Firm* — Ladas & Parry LLP

(57) ABSTRACT

Antenna assembly, electronic device and method for switching antenna are provided. The antenna assembly includes a first antenna structure, second antenna structure and third antenna structure, the first antenna structure is used as a diversity antenna, the second antenna structure is in an idle state, and the third antenna structure is used as a main antenna; a radio frequency module coupled to each of the first antenna structure, the second antenna structure and the third antenna structure through a switch assembly; and the switch assembly arranged to, according to signal quality of the first antenna structure, the second antenna structure and the third antenna structure, switch one of the first antenna structure or the second antenna structure to the main antenna, switch the other of the first antenna structure or the second antenna structure to the idle state and switch the third antenna structure to the diversity antenna.

20 Claims, 12 Drawing Sheets

(51) Int. Cl.
*H01Q 3/24* (2006.01)
*H01Q 5/35* (2015.01)
*H01Q 21/06* (2006.01)
H01Q 9/42 (2006.01)
H01Q 1/28 (2006.01)
H01Q 1/48 (2006.01)

(52) U.S. Cl.
CPC ......... *H04B 7/0814* (2013.01); *H04B 7/0825* (2013.01); *H04B 7/0871* (2013.01); *H01Q 1/28* (2013.01); *H01Q 1/48* (2013.01); *H01Q 9/42* (2013.01)

(58) Field of Classification Search
USPC ....................................................... 343/893
See application file for complete search history.

(56) References Cited

FOREIGN PATENT DOCUMENTS

| | | | |
|---|---|---|---|
| CN | 104638344 | A | 5/2015 |
| CN | 104954039 | A | 9/2015 |
| CN | 106093990 | A | 11/2016 |
| CN | 106129641 | A | 11/2016 |
| CN | 106229683 | A | 12/2016 |
| CN | 106788499 | A | 5/2017 |
| CN | 107453766 | A | 12/2017 |
| CN | 107592132 | A | 1/2018 |
| CN | 107592133 | A | 1/2018 |
| CN | 108270088 | A | 7/2018 |
| CN | 108321524 | A | 7/2018 |
| CN | 108462522 | A | 8/2018 |
| CN | 207852922 | U | 9/2018 |
| WO | 2012166268 | A1 | 12/2012 |
| WO | 2015014285 | A1 | 2/2015 |

OTHER PUBLICATIONS

First Office Action of Chinese application No. 201810054802.9, dated Aug. 2, 2019.
Supplementary European Search Report in the European application No. 18206423.8, dated Jul. 30, 2019.
International Search Report in international application No. PCT/CN2018/116797, dated Jan. 30, 2019.
English Translation of the Written Opinion of the International Search Authority in international application No. PCT/CN2018/116797, dated Jan. 30, 2019.
Second Office Action in Chinese application No. 201810054802.9, dated Jan. 2, 2020.

* cited by examiner

ANTENNA ASSEMBLY, ELECTRONIC DEVICE AND METHOD FOR SWITCHING ANTENNA

CROSS-REFERENCE TO RELATED APPLICATION

The application claims benefits of Chinese Patent Application 201810054802.9 and Chinese Patent Application 201820099124.3, filed on Jan. 19, 2018, the contents of which are hereby incorporated by reference in their entirety.

BACKGROUND

With development of a network technology and improvement of intelligence degrees of electronic devices, a user may implement more and more functions through an electronic device, for example, communication, chatting and playing a game. A signal transmission is implemented through an antenna of the electronic device during the communication and chatting of the user through the electronic device.

When a user uses an electronic device, the electronic device may be in different postures under different service states. For example, the electronic device may be in a portrait state or a landscape state, or the left side of the electronic device is held by the user or the right side of the electronic device is held by the user. When the electronic device is in different postures, an antenna on the electronic device may be located at a position the user holds. When the antenna on the electronic device is in the held position, antenna performance of the electronic device will be reduced.

SUMMARY

Embodiments of the present disclosure provide an antenna assembly, an electronic device and a method for switching an antenna.

In a first aspect, the embodiments of the present disclosure provide an antenna assembly. The antenna assembly may include a first antenna structure, a second antenna structure and a third antenna structure, here, the first antenna structure is used as a diversity antenna, the second antenna structure is in an idle state and the third antenna structure is used as a main antenna; a radio frequency module, coupled to each of the first antenna structure, the second antenna structure and the third antenna structure through a switch assembly; and the switch assembly, arranged to, according to signal quality of the first antenna structure, the second antenna structure and the third antenna structure, switch one of the first antenna structure or the second antenna structure to the main antenna, switch the other of the first antenna structure or the second antenna structure to the idle state, and switch the third antenna structure to the diversity antenna.

In a second aspect, the embodiments of the present disclosure further provide an electronic device. The electronic device may include a housing and an antenna assembly, the antenna assembly may be mounted in the housing and the antenna assembly may include a first antenna structure, configured as one of a main antenna, a diversity antenna or an idle state; a second antenna structure, spaced apart from the first antenna structure, and configured as one of the main antenna, the diversity antenna or the idle state; a power coupler, coupled to each of the first antenna structure and the second antenna structure, and configured to detect impedance matching characteristics of the first antenna structure and the second antenna structure; and a switch assembly, coupled to each of the power coupler, the first antenna structure and the second antenna structure, and configured to, according to the impedance matching characteristics of the first antenna structure and the second antenna structure, configure one of the first antenna structure or the second antenna structure as the main antenna, and configure the other of the first antenna structure or the second antenna structure as the diversity antenna or the idle state.

In a third aspect, the embodiments of the present disclosure further provide a method for switching an antenna, which may be applied to an electronic device, the electronic device includes an antenna assembly, the antenna assembly includes a first antenna structure, a second antenna structure, a power coupler and a switch assembly. The method may include the power coupler detects impedance matching characteristics of the first antenna structure and the second antenna structure; and the switch assembly, according to the impedance matching characteristics of the first antenna structure and the second antenna structure, configures one of the first antenna structure or the second antenna structure as a main antenna, and configures the other of the first antenna structure or the second antenna structure as a diversity antenna or an idle state.

BRIEF DESCRIPTION OF DRAWINGS

In order to describe the technical solutions in the embodiments of the present disclosure more clearly, the drawings required to be used in descriptions of the embodiments will be simply introduced below. It is apparent that the drawings described below are only some embodiments of the present disclosure. Other drawings may further be obtained by those skilled in the art according to these drawings without creative work.

DETAILED DESCRIPTION

Figure 1:
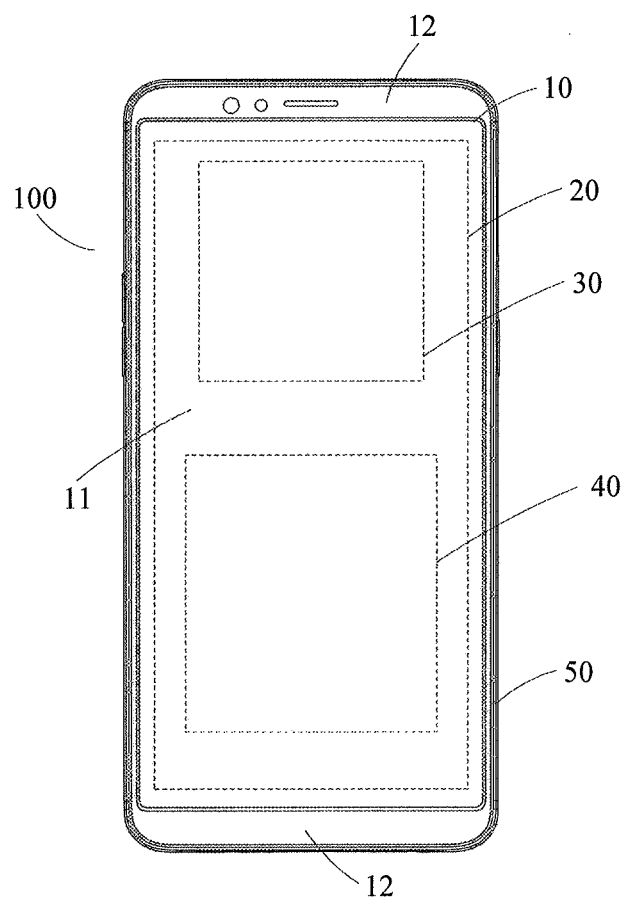
FIG. 1 is a first structure diagram of an electronic device according to an embodiment of the present disclosure.

The technical solutions in the embodiments of the present disclosure will be clearly and completely described below in combination with the drawings in the embodiments of the present disclosure. It is apparent that the described embodiments are not all embodiments but only part of embodiments of the present disclosure. All other embodiments obtained by those skilled in the art on the basis of the embodiments in the present disclosure without creative work shall fall within the scope of protection of the present disclosure.

In the descriptions of the present disclosure, it is to be understood that orientation or position relationships indicated by terms "center", "longitudinal", "transverse", "length", "width", "thickness", "upper", "lower", "front", "back", "left", "right", "vertical", "horizontal", "top", "bottom", "inner", "outer", "clockwise", "counterclockwise" and the like are orientation or position relationships illustrated in the drawings, are adopted not to indicate or imply that indicated devices or components must be in specific orientations or structured and operated in specific orientations but only to conveniently describe the present disclosure and simplify descriptions, and thus cannot be construed as limiting the present disclosure. In addition, terms "first" and "second" are only adopted for description and should not be understood to indicate or imply relative importance or implicitly indicate the number of indicated technical features. Therefore, features defined by "first" and "second" may explicitly or implicitly indicate inclusion of one or more such features. In the descriptions of the present disclosure, "multiple" means two or more than two, unless otherwise limited definitely and specifically.

In the descriptions of the present disclosure, it is to be noted that, unless otherwise definitely specified and limited, terms "mount", "mutually connect" and "connect" should be broadly understood. For example, the terms may refer to fixed connection and may also refer to detachable connection or integrated connection. The terms may refer to mechanical connection and may also refer to electrical connection or mutual communication. The terms may refer to direct mutual connection, may also refer to indirect connection through a medium and may refer to communication in two components or an interaction relationship of the two components. For those of ordinary skill in the art, specific meanings of these terms in the present disclosure can be understood according to a specific condition.

In the present disclosure, unless otherwise definitely specified and limited, the state that a first feature is "above" or "below" a second feature may include that the first and second features directly contact and may also include that the first and second features contact through another feature between the first feature and the second feature rather than directly contact. Moreover, the state that the first feature is "above", "over" and "on" the second feature includes that the first feature is directly over or above the second feature or only represents that a horizontal height of the first feature is higher than that of the second feature. The state that the first feature is "below", "under" and "beneath" the second feature includes that the first feature is directly under or below the second feature or only represents that the horizontal height of the first feature is less than that of the second feature.

The following disclosures provide many different implementation modes or examples to implement different structures of the present disclosure. For simplifying the disclosures of the present disclosure, components and arrangements of specific examples will be described below. Of course, they are merely examples and not intended to limit the present disclosure. In addition, reference numbers and/or reference letters may be repeated in different examples in the present disclosure and such repetitions are made for simplicity and clarity and do not indicate relationships between each discussed implementation mode and/or arrangement. Moreover, examples of various specific processes and materials are provided in the present disclosure. However, those of ordinary skill in the art may realize application of other processes and/or use of other materials.

The embodiments of the present disclosure provide an antenna assembly, an electronic device and a method for switching an antenna.

At least some embodiments of the present disclosure provide an antenna assembly. The antenna assembly includes a first antenna structure, a second antenna structure and a third antenna structure, wherein the first antenna structure is used as a diversity antenna, the second antenna structure is in an idle state and the third antenna structure is used as a main antenna; a radio frequency module, coupled to each of the first antenna structure, the second antenna structure and the third antenna structure through a switch assembly; and the switch assembly, arranged to, according to signal quality of the first antenna structure, the second antenna structure and the third antenna structure, switch one of the first antenna structure or the second antenna structure to the main antenna, switch the other of the first antenna structure or the second antenna structure to the idle state, and switch the third antenna structure to the diversity antenna.

According to at least some embodiments, the switch assembly is arranged to, when the signal quality of the third antenna structure is less than a first preset threshold value, switch the first antenna structure or the second antenna structure to the main antenna and switch the third antenna structure to the diversity antenna.

According to at least some embodiments, the radio frequency module includes a first port and a second port, the first port is arranged to transmit and receive signals and the second port is arranged to receive signals; and the switch assembly is arranged to, according to the signal quality of the first antenna structure, the second antenna structure and the third antenna structure, control the first port of the radio frequency module to be connected with the first antenna structure or the second antenna structure and control the second port of the radio frequency module to be connected with the third antenna structure.

According to at least some embodiments, the switch assembly includes a first input port, a second input port, a first output port, a second output port and a third output port; the first input port is coupled to the first port of the radio frequency module and the second input port is coupled to the second port of the radio frequency module; and the first output port is coupled to the third antenna structure, the second output port is coupled to the first antenna structure and the third output port is coupled to the second antenna structure.

According to at least some embodiments, the switch assembly includes a double-pole multi-throw switch, the first input port and the second input port are input terminals of the double-pole multi-throw switch, and the first output port, the second output port and the third output port are output terminals of the double-pole multi-throw switch.

According to at least some embodiments, the switch assembly includes a first single-pole multi-throw switch and a second single-pole multi-throw switch, the first input port is an input terminal of the first single-pole multi-throw switch and the second input port is an input terminal of the second single-pole multi-throw switch, and the first output port, the second output port and the third output port comprise output terminals of the first single-pole multi-throw switch and output terminals of the second single-pole multi-throw switch.

According to at least some embodiments, the first port of the radio frequency module is coupled to the switch assembly through a power coupler; the power coupler is arranged to detect impedance matching characteristic of the first antenna structure; and the switch assembly is arranged to, when the impedance matching characteristic of the first antenna structure is less than a second preset threshold value, switch the first antenna structure to the idle state and switch the second antenna structure to the main antenna.

According to at least some embodiments, the antenna assembly further includes a Wireless Fidelity (WiFi) module, including a third port and a fourth port for transmitting and receiving WiFi signals; and a fourth antenna structure, coupled to the third port of the WiFi module, and for transmitting and receiving WiFi signals, wherein the switch assembly is further coupled to the fourth port of the WiFi module, and the switch assembly is arranged to control the fourth port of the WiFi module to be connected with one of the first antenna structure, the second antenna structure or the third antenna structure.

According to at least some embodiments, the fourth port of the WiFi module is coupled to the first input port of the switch assembly.

According to at least some embodiments, the antenna assembly further includes a satellite positioning module, comprising a fifth port and a sixth port, the fifth port is arranged to transmit and receive satellite positioning signals and the sixth port is arranged to receive satellite positioning signals; and a fourth antenna structure, coupled to the fifth port of the satellite positioning module, and for transmitting and receiving satellite positioning signals, wherein the switch assembly is further coupled to the sixth port of the satellite positioning module, and the switch assembly is arranged to control the sixth port of the satellite positioning module to be connected with one of the first antenna structure, the second antenna structure or the third antenna structure.

According to at least some embodiments, the antenna assembly further includes an antenna carrier, wherein each of the first antenna structure, the second antenna structure and the third antenna structure is arranged on the antenna carrier.

According to at least some embodiments, a ground point is arranged on the antenna carrier, and each of the first antenna structure, the second antenna structure and the third antenna structure is connected with the ground point.

According to at least some embodiments, the antenna carrier includes a first end portion and a second end portion which are opposite to each other; and the first antenna structure and the second antenna structure are arranged at the first end portion of the antenna carrier and the third antenna structure is arranged at the second end portion of the antenna carrier.

According to at least some embodiments, the first end portion of the antenna carrier comprises a first side and second side which are opposite to each other, and the first antenna structure is arranged on the first side and the second antenna structure is arranged on the second side.

At least some embodiments of the present disclosure provide an electronic device. The electronic device includes a housing and an antenna assembly, wherein the antenna assembly is mounted in the housing, and the antenna assembly includes a first antenna structure, configured as one of a main antenna, a diversity antenna or an idle state; a second antenna structure, spaced apart from the first antenna structure, and configured as one of the main antenna, the diversity antenna or the idle state; a power coupler, coupled to each of the first antenna structure and the second antenna structure, and configured to detect impedance matching characteristics of the first antenna structure and the second antenna structure; and a switch assembly, coupled to each of the power coupler, the first antenna structure and the second antenna structure, and configured to, according to the impedance matching characteristics of the first antenna structure and the second antenna structure, configure one of the first antenna structure or the second antenna structure as the main antenna, and configure the other of the first antenna structure or the second antenna structure as the diversity antenna or the idle state.

According to at least some embodiments, the switch assembly is further configured to, when the first antenna structure is configured as the main antenna and the second antenna structure is configured as the diversity antenna or the idle state, and when the impedance matching characteristic of the first antenna structure is less than a first preset threshold, configure the first antenna structure as the diversity antenna or the idle state and configure the second antenna structure as the main antenna; and configured to, when the first antenna structure is configured as the diversity antenna or the idle state and the second antenna structure is configured as the main antenna, and when the impedance matching characteristic of the second antenna structure is less than the first preset threshold, configure the first antenna structure as the main antenna and configure the second antenna structure as the diversity antenna or the idle state.

According to at least some embodiments, the antenna assembly further comprising: a third antenna structure, spaced apart from the first antenna structure and the second antenna structure, configured as one of the main antenna or the diversity antenna, and coupled to the switch assembly; and wherein the switch assembly is further configured to, when the first antenna structure is configured as the main antenna and the third antenna structure is configured as the diversity antenna, and when signal quality of the first antenna structure is less than a second preset threshold, configure the first antenna structure as the diversity antenna and configure the third antenna structure as the main antenna; and configured to, when the second antenna structure is configured as the main antenna and the third antenna structure is configured as the diversity antenna, and when signal quality of the second antenna structure is less than the second preset threshold, configure the second antenna structure as the diversity antenna and configure the third antenna structure as the main antenna.

At least some embodiments of the present disclosure provide a method for switching an antenna, the method being applied to an electronic device, wherein the electronic device comprises an antenna assembly, the antenna assembly comprises a first antenna structure, a second antenna structure, a power coupler and a switch assembly, and the method comprising: detecting impedance matching characteristics of the first antenna structure and the second antenna structure; and according to the impedance matching characteristics of the first antenna structure and the second antenna structure configuring one of the first antenna structure or the second antenna structure as a main antenna, and configuring the other of the first antenna structure or the second antenna structure as a diversity antenna or an idle state.

According to at least some embodiments, the method further comprising: when the first antenna structure is configured as the main antenna and the second antenna structure is configured as the diversity antenna or the idle state, and when the impedance matching characteristic of the first antenna structure is less than a first preset threshold, configuring the first antenna structure as the diversity antenna or the idle state and configuring the second antenna structure as the main antenna; and when the first antenna structure is configured as the diversity antenna or the idle state and the second antenna structure is configured as the main antenna, and when the impedance matching characteristic of the second antenna structure is less than the first preset threshold, configuring the first antenna structure as the main antenna and configuring the second antenna structure as the diversity antenna or the idle state.

According to at least some embodiments, the electronic device further comprises a third antenna structure, and the method further comprising: when the first antenna structure is configured as the main antenna and the third antenna structure is configured as the diversity antenna, and when signal quality of the first antenna structure is less than a second preset threshold, configuring the first antenna structure as the diversity antenna and configuring the third antenna structure as the main antenna; and when the second antenna structure is configured as the main antenna and the third antenna structure is configured as the diversity antenna, and when signal quality of the second antenna structure is less than the second preset threshold, configuring the second antenna structure as the diversity antenna and configuring the third antenna structure as the main antenna.

According to at least some embodiments, the electronic device further comprises a radio frequency module, a third antenna structure and a fourth antenna structure, and the fourth antenna structure is configured to transmit and receive at least one of Global Positioning System (GPS) signals or short-range communication signals, and the method further comprising: acquiring working state information of the radio frequency module; when the working state information of the radio frequency module is the idle state, acquiring signal quality values of the first antenna structure, the second antenna structure and the third antenna structure; and selecting as a target antenna structure one of the first antenna structure, the second antenna structure or the third antenna structure which has a maximum signal quality value, and determining the target antenna structure as an opportunistic diversity antenna matched with the fourth antenna structure.

At least some embodiments of the present disclosure provide a method for switching an antenna, the method being applied to an electronic device, wherein the electronic device comprises an antenna assembly, the antenna assembly comprises a first antenna structure, a second antenna structure, a third antenna structure, a radio frequency module and a switch assembly, the first antenna structure is used as a diversity antenna, the second antenna structure is in an idle state, and the third antenna structure is used as a main antenna, and the method comprising: acquiring signal quality of the first antenna structure, the second antenna structure and the third antenna structure; and according to the signal quality of the first antenna structure, the second antenna structure and the third antenna structure, controlling the switch assembly to determine one of the first antenna structure or the second antenna structure as the main antenna and determine that the other of the first antenna structure or the second antenna structure is in the idle state, and controlling the switch assembly to switch the third antenna structure to the diversity antenna.

At least some embodiments of the present disclosure provide a method for switching an antenna, the method being applied to an electronic device, wherein the electronic device comprises an antenna assembly, the antenna assembly comprises a first antenna structure, a second antenna structure, a third antenna structure, a radio frequency module, a power coupler and a switch assembly, the first antenna structure is used as a diversity antenna, the second antenna structure is in an idle state, and the third antenna structure is used as a main antenna, and the method comprising: acquiring, by the power coupler, impedance matching degrees of the first antenna structure and the second antenna structure; and when the impedance matching degree of the second antenna structure is greater than the impedance matching degree of the first antenna structure, switching the first antenna structure to the idle state and switching the second antenna structure to the diversity antenna.

According to at least some embodiments, the method further comprising: when the first antenna structure is the diversity antenna, acquiring signal quality values of the first antenna structure and the third antenna structure; and when the signal quality value of the first antenna structure is greater than the signal quality value of the third antenna structure, switching the first antenna structure to the main antenna and switching the third antenna structure to the diversity antenna.

According to at least some embodiments, the method further comprising: when the second antenna structure is the diversity antenna, acquiring signal quality values of the second antenna structure and the third antenna structure; and when the signal quality value of the second antenna structure is greater than the signal quality value of the third antenna structure, switching the second antenna structure to the main antenna and switching the third antenna structure to the diversity antenna.

At least some embodiments of the present disclosure provide a method for switching an antenna, the method being applied to an electronic device, wherein the electronic device comprises an antenna assembly, the antenna assembly comprises a first antenna structure, a second antenna structure, a third antenna structure, a fourth antenna structure, a radio frequency module and a switch assembly, the first antenna structure is used as a diversity antenna, the second antenna structure is in an idle state, the third antenna structure is used as a main antenna, and the fourth antenna structure is arranged to transmit and receive at least one of Global Positioning System (GPS) signals or short-range communication signals, and the method comprising: acquiring working state information of the radio frequency module; when the working state information of the radio frequency module is the idle state, acquiring signal quality values of the first antenna structure, the second antenna structure and the third antenna structure; and selecting the antenna structure corresponding to a maximum signal quality value as a target antenna structure and determining the target antenna structure as an opportunistic diversity antenna matched with the fourth antenna structure.

According to the antenna assembly provided by the embodiments of the present disclosure, the signal quality of each antenna structure of the electronic device may be detected, and when the signal quality of an antenna structure executing a function of the main antenna is lower than the signal quality of other antenna structures, the antenna structure executing the function of the main antenna in the antenna assembly and the antenna structure executing a function of the diversity antenna in the antenna assembly are switched to reduce or avoid influence of a user on communication performance of the electronic device, so that antenna performance of the electronic device may be improved.

Figure 3:
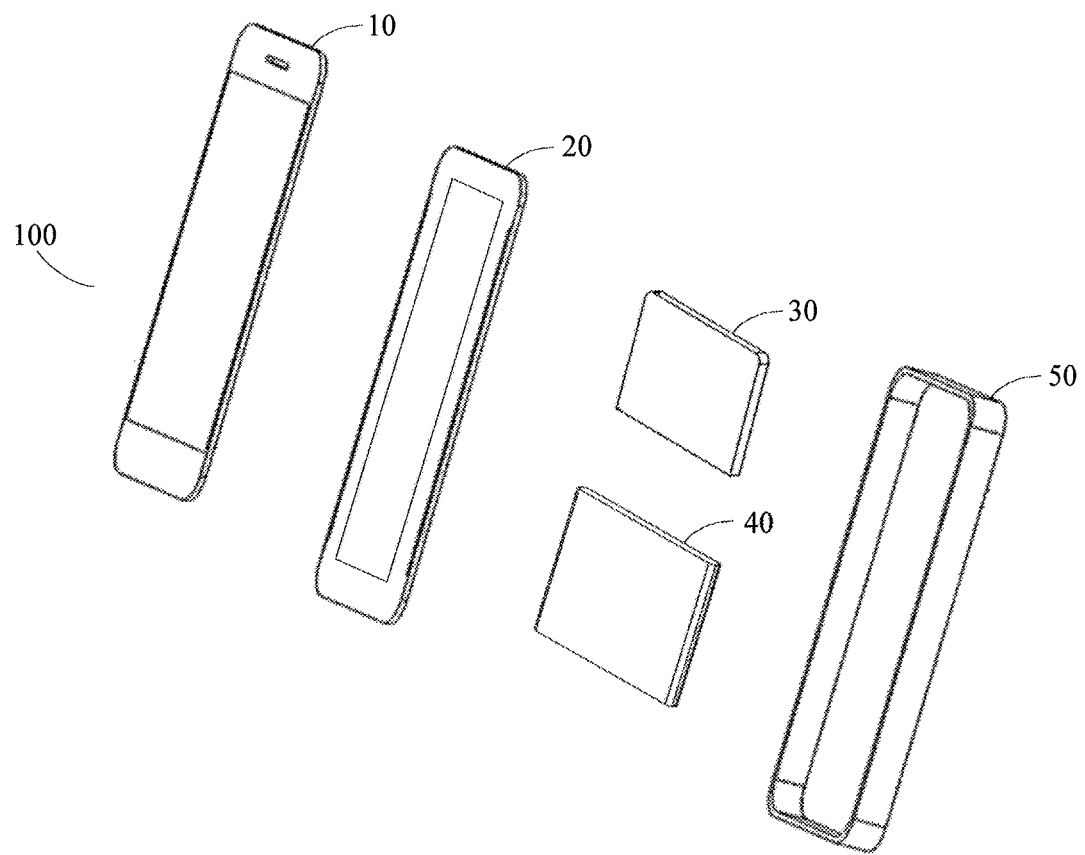
FIG. 3 is an exploded view of an electronic device according to an embodiment of the present disclosure.

An embodiment of the present disclosure provides an electronic device. The electronic device may be a device such as a smart phone and a tablet computer. In some embodiments, referring to FIG. 1 and FIG. 3, the electronic device 100 includes a display screen 10, a middle frame 20, a circuit board 30, a battery 40 and a back cover 50.

The display screen 10 is mounted on the back cover 50 to form a display surface of the electronic device 100. The display screen 10, as a front housing of the electronic device 100, forms an accommodation space with the back cover 50 to accommodate other electronic components or functional components of the electronic device 100. In addition, the display screen 10 forms the display surface of the electronic device 100 to display information such as an image and a text. The display screen 10 may be a display screen of a type such as a Liquid Crystal Display (LCD) or an Organic Light-Emitting Diode (OLED) display screen.

In some embodiments, a glass cover plate may be arranged on the display screen 10. The glass cover plate may cover the display screen 10 to protect the display screen 10 and prevent the display screen 10 from being scratched or damaged by water.

In some embodiments, as illustrated in FIG. 1, the display screen 10 may include a display region 11 and a non-display region 12. The display region 11 executes a display function of the display screen 10 and is arranged to display the information such as the image and the text. The non-display region 12 does not display any information. The non-display region 12 may be arranged for arrangement of functional components such as a camera, a receiver and a display screen touch electrode. In some embodiments, the non-display region 12 may include two regions at an upper part and lower part of the display region 11.

Figure 2:
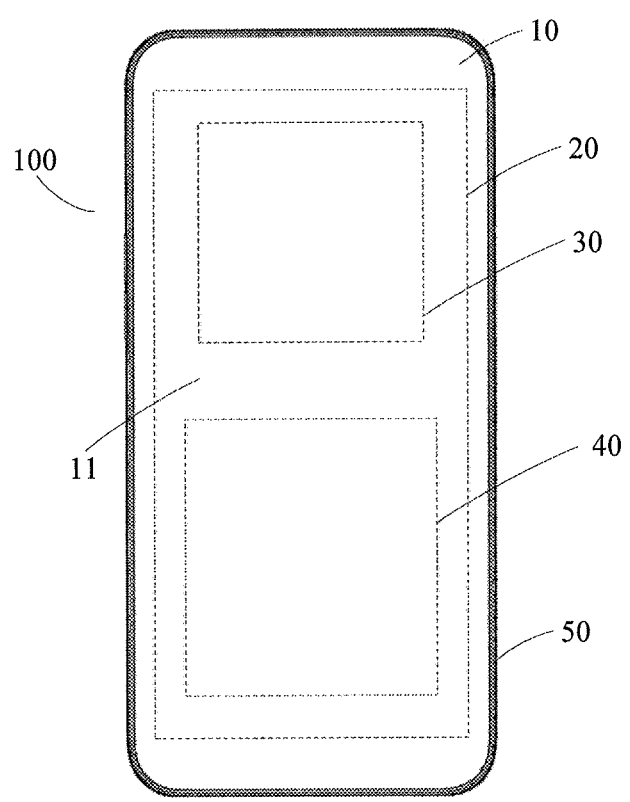
FIG. 2 is a second structure diagram of an electronic device according to an embodiment of the present disclosure.

In some embodiments, as illustrated in FIG. 2, the display screen 10 may be a full screen display. In such case, the display screen 10 may display the information on the full screen, so that the electronic device 100 has a relatively higher screen-to-body ratio. The display screen 10 only includes the display region 11 and does not include the non-display region. In such case, the functional components such as the camera and a proximity sensor in the electronic device 10 may be hidden below the display screen 10 and a fingerprint recognition module of the electronic device 10 may be arranged on a back surface of the electronic device 100.

The middle frame 20 may be a thin plate or sheet structure and may also be a hollow frame structure. The middle frame 20 may be accommodated in the accommodation space formed by the display screen 10 and the back cover 50. The middle frame 20 is arranged to provide a support function for the electronic components or functional components in the electronic device 100 to mount the electronic components and functional components in the electronic device together. For example, the functional components such as the camera, the receiver, the circuit board and a battery in the electronic device may all be mounted on the middle frame 20 for fixation. In some embodiments, a material for the middle frame 20 may include metal or plastics.

The circuit board 30 is mounted in the accommodation space. For example, the circuit board 30 may be mounted on the middle frame 20 and is accommodated in the accommodation space together with the middle frame 20. The circuit board 30 may be a main board of the electronic device 100. A ground point is arranged on the circuit board 30 to implement grounding of the circuit board 30. One, two or more of the functional components such as a motor, a microphone, a loudspeaker, a receiver, an earphone interface, a Universal Serial Bus (USB) interface, a camera, a distance sensor, an ambient light sensor, a gyroscope and a processor may be integrated on the circuit board 30. In addition, the display screen 10 may be electrically connected to the circuit board 30.

In some embodiments, a display control circuit is arranged on the circuit board 30. The display control circuit outputs an electrical signal to the display screen 10 to control the display screen 10 to display the information.

The battery 40 is mounted in the accommodation space. For example, the battery 40 may be mounted on the middle frame 20 and is accommodated in the accommodation space together with the middle frame 20. The battery 40 may be electrically connected to the circuit board 30 to implement power supply of the battery 40 to the electronic device 100. A power management circuit may be arranged on the circuit board 30. The power management circuit is arranged to allocate a voltage provided by the battery 40 to each electronic component in the electronic device 100.

The back cover 50 is arranged to form an outer contour of the electronic device 100. The back cover 50 may be integrally formed. In a forming process of the back cover 50, structures such as a rear camera hole and a fingerprint recognition module mounting hole may be formed on the back cover 50.

In some embodiments, the back cover 50 may be a metal back cover, for example, metals of a magnesium alloy and stainless steel. It is to be noted that a material for the back cover 50 of the embodiment of the present disclosure is not limited thereto and another manner may also be adopted. For example, the back cover 50 may be a plastic back cover. For another example, the back cover 50 may be a ceramic back cover. For yet another example, the back cover 50 may include a plastic part and a metal part and the back cover 50 may be a back cover structure formed by matching use of metal and plastics. Specifically, the complete back cover structure may be formed by forming the metal part at first, for example, forming a magnesium alloy substrate in an injection molding manner, and injection molding plastics on the magnesium alloy substrate to form a plastic substrate.

In some embodiments, an antenna structure may be formed on the middle frame 20. The antenna structure may be arranged to transmit and/or receive a wireless signal. Electronic components such as a radio frequency module and a switch assembly may be arranged on the circuit board 30. In such case, the antenna structure formed on the middle frame 20 and the electronic components arranged on the circuit board 30 may form an antenna assembly.

Figure 4:
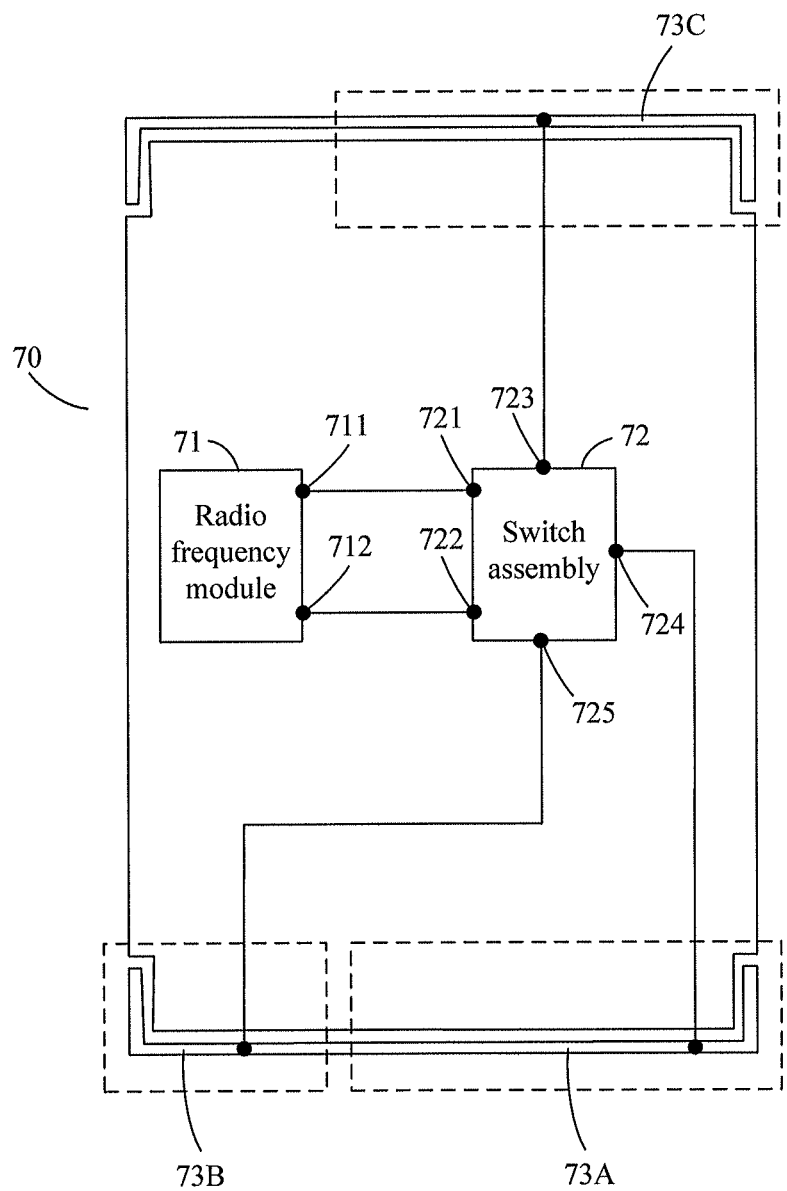
FIG. 4 is a first structure diagram of an antenna assembly according to an embodiment of the present disclosure.

In some embodiments, referring to FIG. 4, FIG. 4 is a structure diagram of an antenna assembly 70. The antenna assembly 70 includes a radio frequency module 71, a switch assembly 72 and at least three antenna structures 73A, 73B and 73C. The radio frequency module 71 is coupled to each of the three antenna structures 73A, 73B and 73C through the switch assembly 72. In some embodiments, the three antenna structures 73A, 73B and 73C may be antenna radiators.

It is to be noted that any one of the three antenna structures 73A, 73B or 73C may be used as a first antenna structure, any another one of the three antenna structures 73A, 73B or 73C may be used as a second antenna structure and the remaining one of the three antenna structures 73A, 73B or 73C may be used as a third antenna structure. For example, the antenna structure 73A may be used as the first antenna structure, the antenna structure 73B may be used as the second antenna structure and the antenna structure 73C may be used as the third antenna structure. Here, the first antenna structure, the second antenna structure and the third antenna structure are adopted not to limit specific positions of the antenna structures but only to distinguish different antenna structures.

The radio frequency module 71 may be arranged on the circuit board 30 of the electronic device 100. The radio frequency module 71 includes a first port 711 and a second port 712. The first port 711 is arranged to transmit and receive signals and the second port 712 is arranged to receive signals.

For example, the first port 711 may be arranged to transmit and receive at least one of a Low Band (LB) signal, a Middle Band (MB) signal or a High Band (HB) signal. The second port 712 may be arranged to receive at least one of the LB signal, the MB signal or the HB signal.

Each of the at least three antenna structures 73A, 73B and 73C is arranged to transmit and/or receive signals. Here, each of the at least three antenna structures 73A, 73B and 73C may independently complete at least one of signal transmission or signal reception.

It is to be noted that antennas in the electronic device 100 may be divided into a main antenna and a diversity antenna. The main antenna is arranged to transmit and receive signals and the diversity signal is only arranged to receive signals. The at least three antenna structures 73A, 73B and 73C may not only be used as main antenna structures of the electronic device 100 but also be used as diversity antenna structures of the electronic device 100. Practical functions of the at least three antenna structures 73A, 73B and 73C may be set according to a requirement.

The three antenna structures 73A, 73B and 73C have an initial state. In the initial state, the third antenna structure 73C is used as a main antenna, the first antenna structure 73A is used as a diversity antenna and the second antenna structure 73B is in an idle state.

The switch assembly 72 is arranged to, according to detected signal quality of the three antenna structures 73A, 73B and 73C, switch the first antenna structure 73A or the second antenna structure 73B to the main antenna and switch the third antenna structure 73C to the diversity antenna.

The switch assembly 72 is coupled to the first port 711 and second port 712 of the radio frequency module 71 and coupled to the at least three antenna structures 73A, 73B and 73C. The switch assembly 72 is arranged to, according to the detected signal quality of the three antenna structures 73A, 73B and 73C, control the first port 711 of the radio frequency module 71 to be connected with one of the at least three antenna structures 73A, 73B or 73C and control the second port 712 of the radio frequency module 71 to be connected with another one of the at least three antenna structures 73A, 73B or 73C. For example, in some embodiments, the switch assembly 72 is arranged to, according to the detected signal quality of the three antenna structures 73A, 73B and 73C, control the first port 711 of the radio frequency module 71 to be connected with the first antenna structure 73A or the second antenna structure 73B and control the second port 712 of the radio frequency module 71 to be connected with the third antenna structure 73C.

It is to be noted that the abovementioned connection represents the electrical connection state between the electronic components and electrical signals may be transmitted between the mutually connected electronic components.

Since the first port 711 of the radio frequency module 71 is arranged to transmit and receive signals, when the first port 711 is connected to one of the antenna structures 73A, 73B or 73C and, for example, is connected to the antenna structure 73B, the connected antenna structure 73B executes signal transmission and reception, that is, the connected antenna structure 73B is used as a main antenna structure of the electronic device 100.

Since the second port 712 of the radio frequency module 71 is arranged to receive signals, when the second port 712 is connected to another one of the antenna structures 73A, 73B or 73C and, for example, is connected to the antenna structure 73C, the other connected antenna structure 73C executes signal reception, that is, the connected antenna structure 73C is used as a diversity antenna structure of the electronic device 100.

In some embodiments, as illustrated in FIG. 4, the switch assembly 72 includes a first input port 721, a second input port 722, a first output port 723, a second output port 724 and a third output port 725. The first input port 721 is coupled to the first port 711 of the radio frequency module 71. The second input port 722 is coupled to the second port 712 of the radio frequency module 71. The first output port 723 is coupled to the third antenna structure 73C. The second output port 724 is coupled to the first antenna structure 73A. The third output port 725 is coupled to the second antenna structure 73B.

The first input port 721 may be connected with any one of the first output port 723, the second output port 724 or the third output port 725. The second input port 722 may also be connected with any one of the first output port 723, the second output port 724 or the third output port 725.

In a practical application, when the first input port 721 is connected with one of the first output port 723, the second output port 724 or the third output port 725, the second input port 722 is connected with another one of the first output port 723, the second output port 724 or the third output port 725.

For example, when the first input port 721 is connected with the first output port 723, the second input port 722 is connected with the second output port 724 or the third output port 725. Therefore, occurrence of the condition that the first input port 721 and the second input port 722 are connected with the same output port may be avoided.

Figure 5:
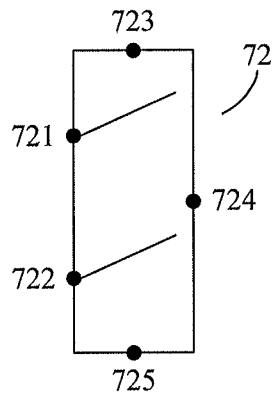
FIG. 5 is a structure diagram of a switch assembly in the antenna assembly illustrated in FIG. 4.

In some embodiments, as illustrated in FIG. 5, the switch assembly 72 includes a double-pole multi-throw switch. For example, the switch assembly 72 may be a double-pole three-throw switch. The first input port 721 and the second input port 722 are input terminals of the double-pole multi-throw switch. The first output port 723, the second output port 724 and the third output port 725 are output terminals of the double-pole multi-throw switch. Both of the first input port 721 and the second input port 722 may be connected with any one of the first output port 723, the second output port 724 or the third output port 725.

Figure 6:
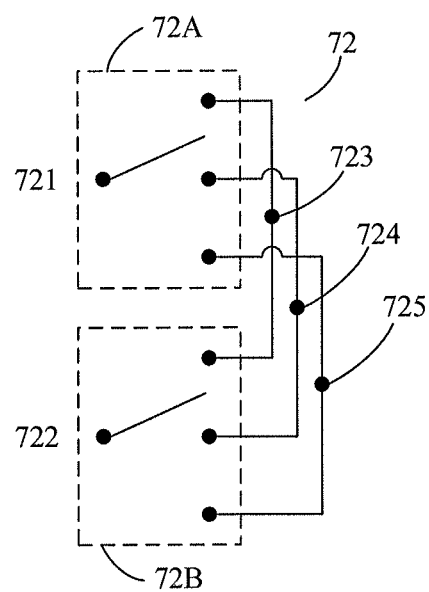
FIG. 6 is another structure diagram of a switch assembly in the antenna assembly illustrated in FIG. 4.

In some embodiments, as illustrated in FIG. 6, the switch assembly 72 includes a first single-pole multi-throw switch 72A and a second single-pole multi-throw switch 72B. For example, both of the first single-pole multi-throw switch 72A and the second single-pole multi-throw switch 72B are single-pole three-throw switches. The first input port 721 is an input terminal of the first single-pole multi-throw switch 72A and the second input port 722 is an input terminal of the second single-pole multi-throw switch 72B. The first output port 723, the second output port 724 and the third output port 725 include output terminals of the first single-pole multi-throw switch 72A and output terminals of the second single-pole multi-throw switch 72B.

For example, each output terminal of the first single-pole multi-throw switch 72A may be connected with an output terminal of the second single-pole multi-throw switch 72B to form the first output port 723, the second output port 724 and the third output port 725.

In some embodiments, the antenna assembly further includes a fourth antenna structure. The fourth antenna structure may receive at least one of Global Positioning System (GPS) signals or short-range communication signals. For example, GPS and Wireless Fidelity (WiFi) 2.4th-Generation (2.4G)/5th-Generation (5G) signals are transmitted and received. It is to be noted that the fourth antenna structure is not limited to transmit and receive the GPS and WiFi 2.4G/5G signals and may also transmit and receive other signals, for example, a Bluetooth signal.

Figure 7:
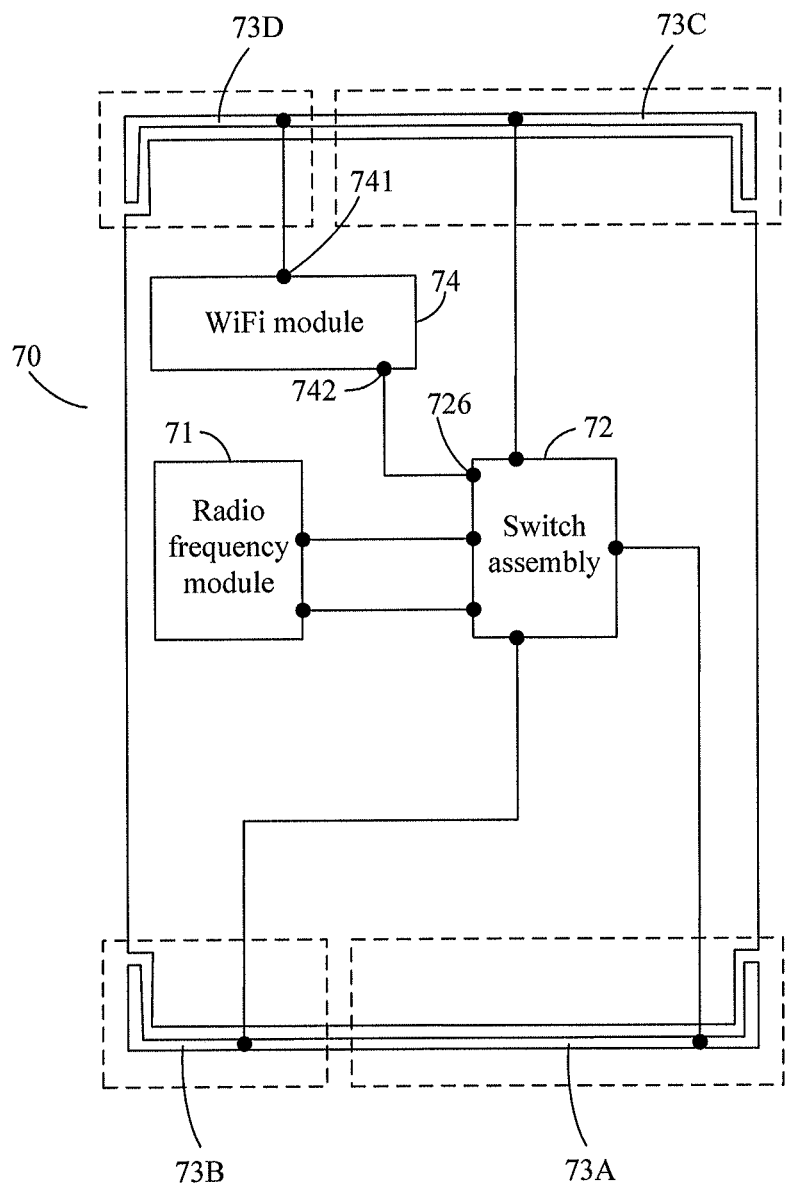
FIG. 7 is a second structure diagram of an antenna assembly according to an embodiment of the present disclosure.

In some embodiments, referring to FIG. 7, the antenna assembly 70 further includes a WiFi module 74 and a fourth antenna structure 73D.

The WiFi module 74 includes a third port 741 and a fourth port 742. The third port 741 is arranged to transmit and receive WiFi signals. The fourth port 742 is arranged to receive WiFi signals.

The WiFi signals transmitted and received by the third port 741 include signals of which frequencies are 2.4 GHz and 5 GHz. The WiFi signals transmitted and received by the fourth port 742 also include signals of which frequencies are 2.4 GHz and 5 GHz.

The fourth antenna structure 73D is arranged to transmit and receive WiFi signals. The fourth antenna structure 73D is coupled to the third port 741 of the WiFi module 74.

The switch assembly 72 is also coupled to the fourth port 742 of the WiFi module 74. The switch assembly 72 is arranged to control the fourth port 742 of the WiFi module 74 to be connected with one of the first antenna structure 73A, the second antenna structure 73B or the third antenna structure 73C.

When the fourth port 742 of the WiFi module 74 is connected with one of the antenna structures 73A, 73B or 73C, the connected antenna structure executes a WiFi signal receiving function of the electronic device 100. Therefore, the fourth antenna structure 73D is used as a WiFi main antenna of the electronic device 100 and the connected one of the antenna structures 73A, 73B or 73C is used as a WiFi opportunistic diversity antenna of the electronic device 100. A diversity receiving function of WiFi signals is realized.

In some embodiments, as illustrated in FIG. 7, the switch assembly 72 further includes a third input port 726. The third input port 726 is coupled to the fourth port 742 of the WiFi module 74. The third input port 726 may also be connected with any one of the first output port 723, the second output port 724 or the third output port 725.

In some embodiments, the fourth port 742 of the WiFi module 74 is coupled to the first input port 721 of the switch assembly.

In short-range communication, the WiFi module 74 transmits and receives signals by use of the fourth antenna structure 73D. In some embodiments, in short-range communication, for example, WiFi communication, when the radio frequency module 71 does not use one of the three antenna structures 73A, 73B and 73C as the main antenna or the diversity antenna, the WiFi module 74 uses one of the first antenna structure 73A, the second antenna structure 73B or the third antenna structure 73C as an opportunistic diversity antenna of the WiFi module 74 to form a diversity receiving antenna system with the fourth antenna structure 73D in order to improve antenna performance. Specifically, the WiFi module 74 includes two antenna channels: a first antenna channel and a second antenna channel. The first antenna channel is connected with the fourth antenna structure 73D. The second antenna channel is connected with one of the three antenna structures 73A, 73B or 73C through the switch assembly 72. It is to be noted that the antenna assembly may be provided with a fifth antenna structure. The fifth antenna structure is connected with the second antenna channel of the WiFi module 74. The fifth antenna structure is not connected with the radio frequency module 71.

Figure 8:
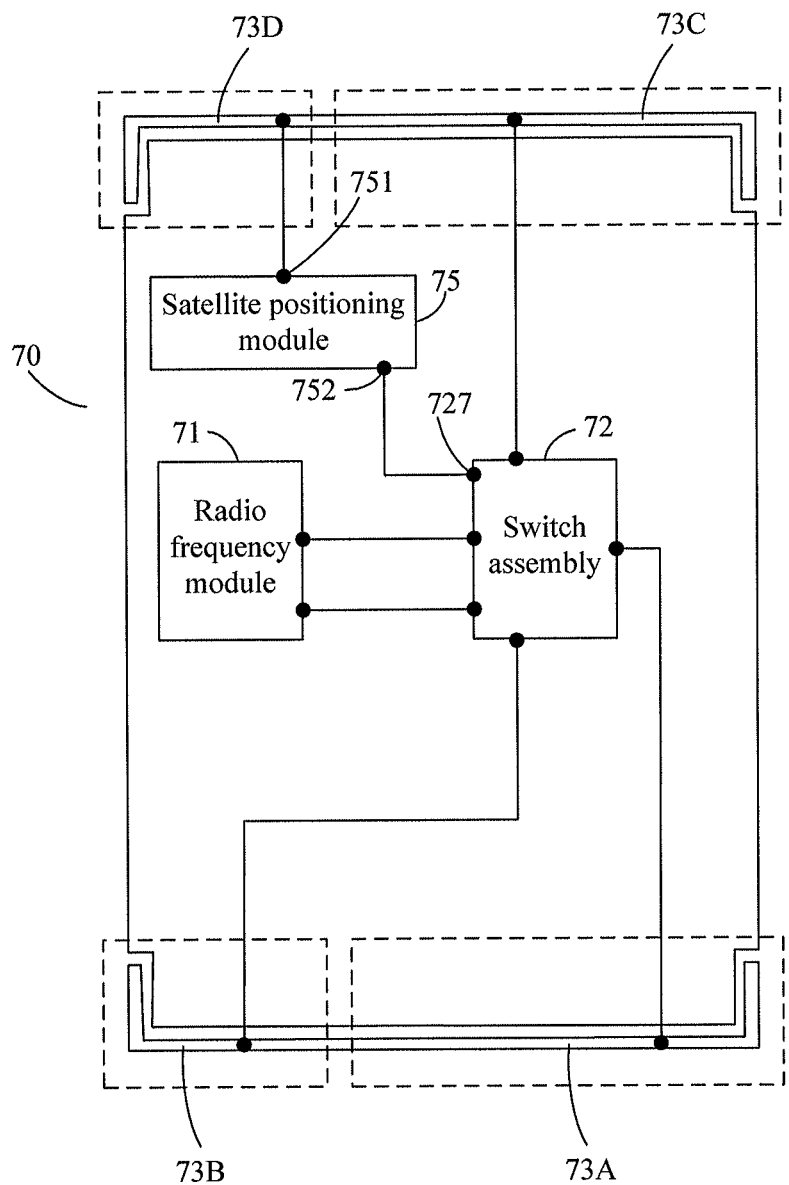
FIG. 8 is a third structure diagram of an antenna assembly according to an embodiment of the present disclosure.

In some embodiments, referring to FIG. 8, the antenna assembly 70 further includes a satellite positioning module 75 and a fourth antenna structure 73D.

The satellite positioning module 75 includes a fifth port 751 and a sixth port 752. The fifth port 751 is arranged to transmit and receive satellite positioning signals and the sixth port 752 is arranged to receive satellite positioning signals.

The satellite positioning signals transmitted and received by the fifth port 751 include at least one of a GPS signal, a BeiDou Navigation Satellite System (BDS) signal or a Global Navigation Satellite System (GLONASS) signal. The satellite positioning signals received by the sixth port 752 also include at least one of the GPS signal, the BDS signal or the GLONASS signal.

The fourth antenna structure 73D is arranged to transmit and receive satellite positioning signals. The fourth antenna structure 73D is coupled to the fifth port 751 of the satellite positioning module 75.

The switch assembly 72 is also coupled to the sixth port 752 of the satellite positioning module 75. The switch assembly 72 is arranged to control the sixth port 752 of the satellite positioning module 75 to be connected with one of the first antenna structure 73A, the second antenna structure 73B or the third antenna structure 73C.

When the sixth port 752 of the satellite positioning module 75 is connected with one of the antenna structures 73A, 73B or 73C, the connected antenna structure executes a satellite positioning signal receiving function of the electronic device 100. Therefore, the fourth antenna structure 73D is used as a satellite positioning main antenna of the electronic device 100 and the connected one of the antenna structures 73A, 73B or 73C is used as a satellite positioning opportunistic diversity antenna of the electronic device 100.

In some embodiments, the connected one of the antenna structures 73A, 73B or 73C, when determined as the satellite positioning opportunistic diversity antenna of the electronic device 100, may also execute a satellite positioning signal transmission and receiving function of the electronic device 100.

It is to be noted that in some embodiments, the antenna assembly 70 may include both of the WiFi module 74 and the satellite positioning module 75. In such case, the fourth antenna structure 73D is arranged to transmit and receive WiFi signals and satellite positioning signals.

In some embodiments, as illustrated in FIG. 8, the switch assembly 72 further includes a fourth input port 727. The fourth input port 727 is coupled to the sixth port 752 of the satellite positioning module 75. The fourth input port 727 may also be connected with any one of the first output port 723, the second output port 724 or the third output port 725.

In some embodiments, the sixth port 752 of the satellite positioning module 75 is coupled to the first input port 721 of the switch assembly.

Figure 9:
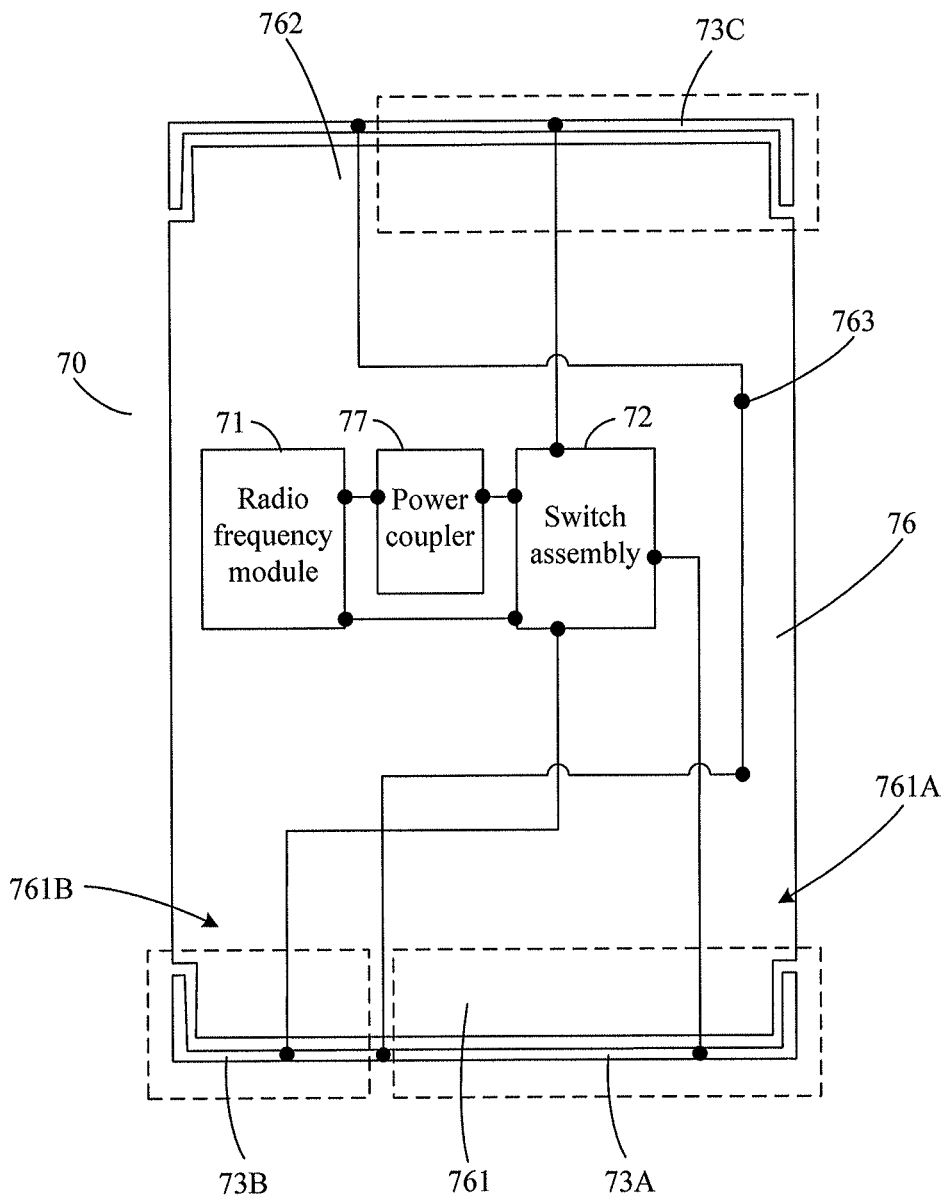
FIG. 9 is a fourth structure diagram of an antenna assembly according to an embodiment of the present disclosure.

In some embodiments, referring to FIG. 9, the antenna assembly 70 further includes an antenna carrier 76. Each of the first antenna structure 73A, the second antenna structure 73B and the third antenna structure 73C are arranged on the antenna carrier 76.

In some embodiments, the antenna carrier 76 may be the middle frame 20 or back cover 50 of the electronic device 100. That is, each of the at least three antenna structures 73A, 73B and 73C may be arranged on the middle frame 20 of the electronic device 100 or on the back cover 50 of the electronic device 100.

It is to be noted that when the antenna carrier 76 is the middle frame 20 of the electronic device 100, each of the at least three antenna structures 73A, 73B and 73C may be a metal sheet, for example, magnesium alloy sheets, attached to the middle frame 20. The at least three antenna structures 73A, 73B and 73C may also be part of the middle frame 20. For example, three metal extending members, for example, magnesium alloy extending members, may be formed on the middle frame 20. The three formed magnesium alloy extending members are used as the antenna structures 73A, 73B and 73C respectively.

When the antenna carrier 76 is the back cover 50 of the electronic device 100, each of the at least three antenna structures 73A, 73B and 73C may be a metal sheet, for example, magnesium alloy sheets, attached to the back cover 50.

In some embodiments, as illustrated in FIG. 9, a ground point 763 is arranged on the antenna carrier 76. The ground point 763 may be connected to a ground point on a circuit board 30 of the electronic device 100 to implement grounding of the antenna carrier 76. Each of the first antenna structure 73A, the second antenna structure 73B and the third antenna structure 73C is connected with the ground point 763. Therefore, grounding of the at least three antenna structures 73A, 73B and 73C may be implemented respectively.

Figure 10:
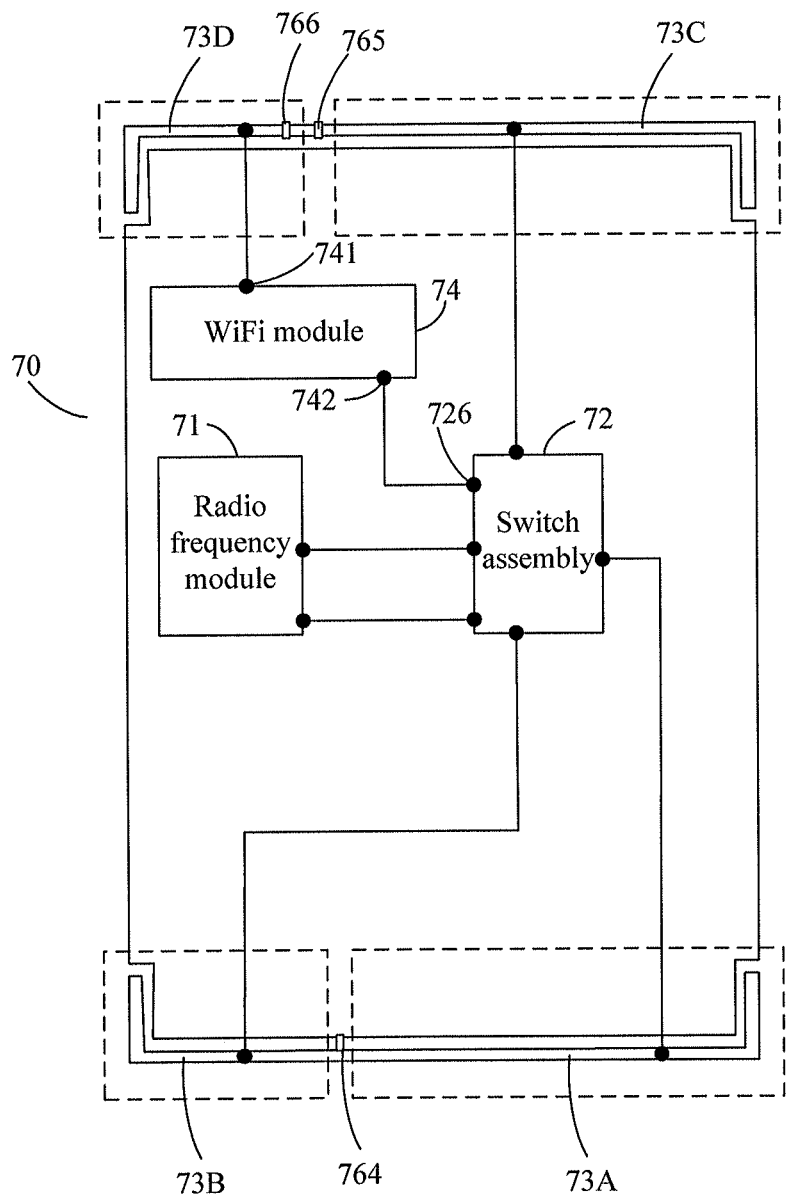
FIG. 10 is a fifth structure diagram of an antenna assembly according to an embodiment of the present disclosure.

In some embodiments, as illustrated in FIG. 10, the antenna assembly includes a first ground point 764. The first ground point 764 is arranged between the first antenna structure 73A and the second antenna structure 73B. The antenna assembly further includes a second ground point 765 and a third ground point 766. The second ground point 765 and the third ground point 766 are arranged between the third antenna structure 73C and the fourth antenna structure 73D.

The first ground point 764, the second ground point 765 and the third ground point 766 may form an integrated metal structure with a reference ground of the whole device. The first ground point 764, the second ground point 765 and the third ground point 766 may also be connected to the reference ground of the whole device by adopting metal sheets. The first ground point 764, the second ground point 765 and the third ground point 766 may also be fixedly connected to the reference ground of the whole device in a welding manner. The first ground point 764, the second ground point 765 and the third ground point 766 may also be fixedly connected to the reference ground of the whole device in a bolt screwing locking manner.

Figure 11:
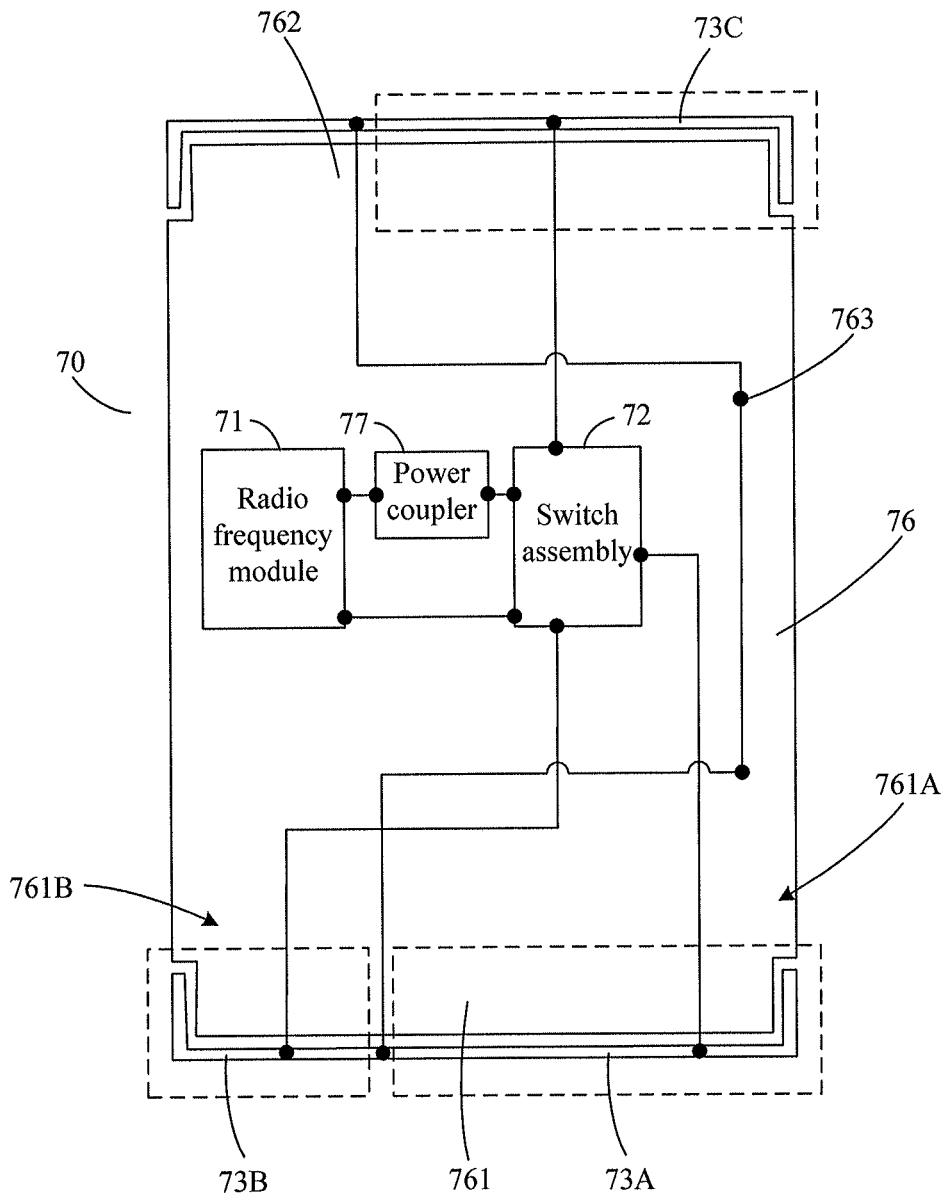
FIG. 11 is a sixth structure diagram of an antenna assembly according to an embodiment of the present disclosure.

In some embodiments, as illustrated in FIG. 11, the antenna assembly further includes a power coupler 77. The power coupler 77 may be mounted on the carrier 76. Specifically, one end of the power coupler 77 is connected with the first port 711 of the radio frequency module 71 and the other end of the power coupler 77 is connected with the first input port 721 of the switch assembly.

The power coupler 77 may detect impedance matching characteristic of the first antenna structure 73A and impedance matching characteristic of the second antenna structure 73B, compare impedance changes of different antenna structures to judge which radiator is covered, for example, held by a hand of the user, and switch the corresponding antenna to an uncovered antenna structure. Cyclic detection may also be performed, so as to improve reliability. The antenna structure with relatively high antenna performance is used as an antenna.

Further, the signal quality (for example, Received Signal Code Power, RSCP) of the antenna structure with relatively high impedance matching characteristic in the first antenna structure 73A and the second antenna structure 73B is acquired, and the signal quality (for example, RSCP) of the third antenna structure 73C is acquired, then the antenna structure with better signal quality is selected as the main antenna and the antenna structure with relatively poor signal quality is selected as the diversity antenna. For example, the first antenna structure 73A or the second antenna structure 73B is combined with the third antenna structure 73C for use. Then, the antenna structure with better signal quality is selected as the main antenna and the antenna structure with relatively poor signal quality is selected as the diversity antenna. For example, under the condition that the electronic device is used in a portrait state, a combination of the first antenna structure 73A and the third antenna structure 73C is selected, or a combination of the second antenna structure 73B and the third antenna structure 73C is selected. When the bottom of the electronic device is held by the hand, the third antenna structure 73C is selected as the main antenna, and the first antenna structure 73A or the second antenna structure 73B is selected as the diversity antenna. When the electronic device is held by the hand in a left landscape state, the combination of the third antenna structure 73C and the second antenna structure 73B is selected and the second antenna structure 73B may be selected as the main antenna. When the electronic device is held by the hand in a right landscape state, the combination of the third antenna structure 73C and the first antenna structure 73A is selected and the first antenna structure 73A or the third antenna structure 73C may be selected as the main antenna.

In some embodiments, as illustrated in FIG. 11, the antenna carrier 76 includes a first end portion 761 and second end portion 762 which are opposite to each other. For example, the first end portion 761 may be a top of the antenna carrier 76 and the second end portion 762 may be a bottom of the antenna carrier 76.

Two of the at least three antenna structures 73A, 73B or 73C are arranged at the first end portion of the antenna carrier 76 and the other of the at least three antenna structures 73A, 73B or 73C is arranged at the second end portion of the antenna carrier 76.

For example, the first antenna structure 73A and second antenna structure 73B of the at least three antenna structures are arranged at the first end portion 761 of the antenna carrier 76 and the third antenna structure 73C of the at least three antenna structures is arranged at the second end portion 762 of the antenna carrier 76.

In some embodiments, as illustrated in FIG. 11, the first end portion 761 of the antenna carrier 76 includes a first side 761A and second side 761B which are opposite to each other. For example, the first side 761A may be a right side of the first end portion 761 and the second side 761B may be a left side of the first end portion 761. The first antenna structure 73A is arranged on the first side 761A and the second antenna structure 73B is arranged on the second side

761B. Here, the first end portion 761 may be the bottom of the electronic device and may also be the top of the electronic device.

An embodiment of the present disclosure further provides a method for switching an antenna. The method for switching the antenna is applied to the electronic device 100 of any abovementioned embodiment.

Figure 12:
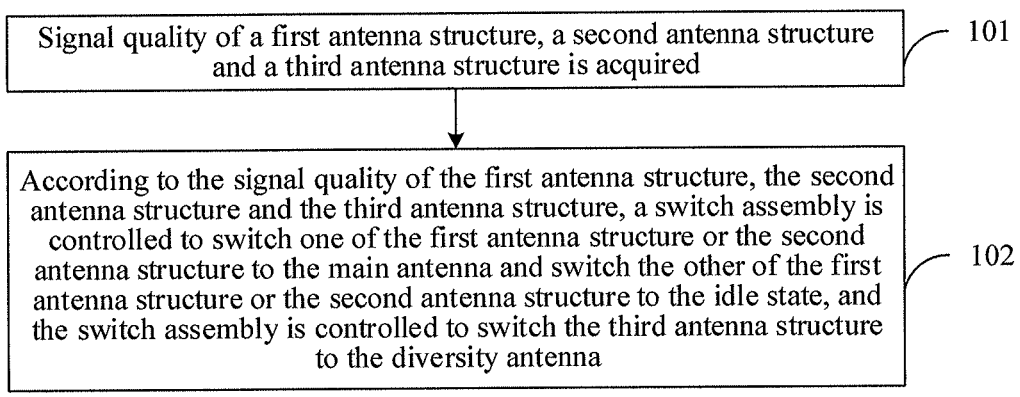
FIG. 12 is a flowchart of a method for switching an antenna according to an embodiment of the present disclosure.

The electronic device 100 includes an antenna assembly 70. The antenna assembly 70 includes a first antenna structure 73A, a second antenna structure 73B, a third antenna structure 73C, a radio frequency module 71 and a switch assembly 72. The antenna assembly 70 has an initial state. In the initial state, the third antenna structure 73C is used as a main antenna, the first antenna structure 73A is used as a diversity antenna and the second antenna structure 73B is in an idle state. In the initial state, as illustrated in FIG. 12, a specific flow of the method is as follows.

In 101, signal quality of the first antenna structure, the second antenna structure and the third antenna structure is acquired.

In 102, according to the signal quality of the first antenna structure, the second antenna structure and the third antenna structure, the switch assembly is controlled to switch one of the first antenna structure or the second antenna structure to the main antenna and switch the other of the first antenna structure or the second antenna structure to the idle state, and the switch assembly is controlled to switch the third antenna structure to the diversity antenna.

In some embodiments, when transmitted power of the first antenna structure is less than a first threshold value and received power of the second antenna structure and the third antenna structure is greater than a second threshold value, one of the first antenna structure or the second antenna structure is used as the main antenna, the other of the first antenna structure or the second antenna structure is determined to be in the idle state and the third antenna structure is switched to the diversity antenna.

In some embodiments, under the condition of not considering the initial state of each antenna structure, the switching of the antenna may also be implemented by the following operations, specifically as follows.

(1) Impedance matching characteristics of the first antenna structure and the second antenna structure are acquired.

The impedance matching characteristics of the first antenna structure and the second antenna structure may be detected through a power coupler in the electronic device. When the impedance matching characteristic of the first antenna structure is better, the first antenna structure is selected as a target antenna structure and the second antenna structure is in the idle state. When the impedance matching characteristic of the second antenna structure is better, the second antenna structure is selected as the target antenna structure and the first antenna structure is in the idle state. Specifically, the power coupler detects the impedance matching characteristic of the first antenna structure and the impedance matching characteristic of the second antenna structure, compares impedance changes of different antenna structures to determine a specific radiator which is covered, for example, held by a hand of a user, and then switches the antenna structure corresponding to the main antenna to an uncovered antenna structure. Cyclic detection may also be performed, so as to improve reliability.

(2) The signal quality of the target antenna structure and the third antenna structure is detected, the antenna structure with the best signal quality is selected as the main antenna and the antenna structure with relatively poor signal quality is selected as the diversity antenna.

The signal quality (for example, RSCP) of the target antenna structure is acquired and the signal quality (for example, RSCP) of the third antenna structure 73C is acquired, then the antenna structure with better signal quality is selected as the main antenna and the antenna structure with relatively poor signal quality is selected as the diversity antenna. The first antenna structure 73A or the second antenna structure 73B is combined with the third antenna structure 73C for use. Then, the antenna structure with better signal quality is selected as the main antenna and the antenna structure with relatively poor signal quality is selected as the diversity antenna.

For example, under the condition that the electronic device is used in a portrait state, a combination of the first antenna structure 73A and the third antenna structure 73C is selected, or a combination of the second antenna structure 73B and the third antenna structure 73C is selected. When the bottom of the electronic device is held by the hand, the third antenna structure 73C is selected as the main antenna and the first antenna structure 73A or the second antenna structure 73B is selected as the diversity antenna.

For another example, when the electronic device is held by the hand in a left landscape state, the combination of the third antenna structure 73C and the second antenna structure 73B is selected. Here, the second antenna structure 73B may be selected as the main antenna.

For yet another example, when the electronic device is held by the hand in a right landscape state, the combination of the third antenna structure 73C and the first antenna structure 73A is selected. Here, the first antenna structure 73A or the third antenna structure 73C may be selected as the main antenna.

An embodiment of the present disclosure further provides a method for switching an antenna. The method for switching antenna is applied to the electronic device 100 of any abovementioned embodiment.

Figure 13:
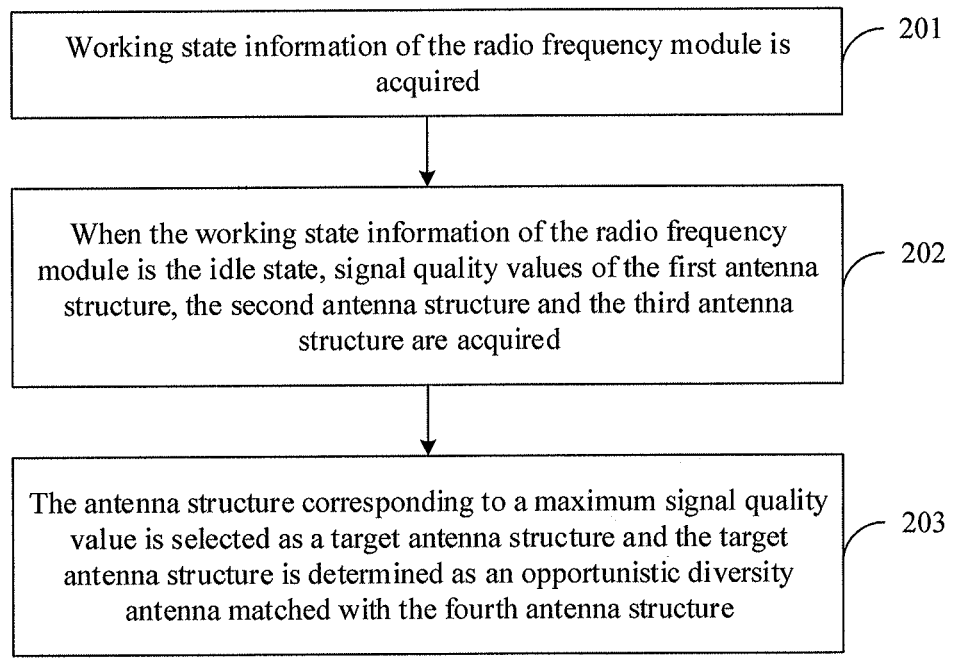
FIG. 13 is another flowchart of a method for switching an antenna according to an embodiment of the present disclosure.

The electronic device 100 includes an antenna assembly 70. The antenna assembly 70 includes a first antenna structure 73A, a second antenna structure 73B, a third antenna structure 73C, a fourth antenna structure 73D, a radio frequency module 71 and a switch assembly 72. The antenna assembly 70 has an initial state. In the initial state, the third antenna structure 73C is used as a main antenna, the first antenna structure 73A is used as a diversity antenna, the second antenna structure 73B is in an idle state and the fourth antenna structure is arranged to transmit and receive at least one of GPS signals or short-range communication signals. In the initial state, as illustrated in FIG. 13, a specific flow of the method is as follows.

In 201, working state information of the radio frequency module is acquired.

In 202, when the working state information of the radio frequency module is the idle state, signal quality values of the first antenna structure, the second antenna structure and the third antenna structure are acquired.

In 203, the antenna structure corresponding to a maximum signal quality value is selected as a target antenna structure and the target antenna structure is determined as an opportunistic diversity antenna matched with the fourth antenna structure.

It can be understood that the antenna structure with the best signal quality is selected as the opportunistic diversity antenna matched with the fourth antenna structure 73D.

In short-range communication, a WiFi module 74 transmits and receives signals by use of the fourth antenna structure 73D. In short-range communication, when the radio frequency module 71 does not use one of the first antenna structure 73A, the second antenna structure 73B and the third antenna structure 73C as the main antenna or the diversity antenna, the WiFi module 74 uses one of the first antenna structure 73A, the second antenna structure 73B or the third antenna structure 73C as an opportunistic diversity antenna of the WiFi module 74 to form a double receiving antenna system with the fourth antenna structure 73D in order to improve antenna performance. Specifically, the WiFi module includes two antenna channels. The first antenna channel is directly connected with the fourth antenna structure 73D and the second antenna channel is connected with the antenna structure with best signal quality in the first antenna structure 73A, the second antenna structure 73B and the third antenna structure 73C through the switch assembly 72. The second antenna channel is mainly arranged for diversity signal reception. For example, under the condition that the electronic device is used in a portrait state, a combination of the fourth antenna structure 73D and the third antenna structure 73C is selected. When the electronic device is held by the hand in a left landscape state, a combination of the fourth antenna structure 73D and the second antenna structure 73B is selected. When the electronic device is held by the hand in a right landscape state, a combination of the fourth antenna structure 73D and the first antenna structure 73A is selected.

The antenna assembly, electronic device and method for switching the antenna provided in the embodiments of the present disclosure are introduced above in detail. The principles and implementation modes of the present disclosure are elaborated with specific examples in the present disclosure. The above descriptions of the embodiments are only made to help the present disclosure to be understood. In addition, those skilled in the art may make variations to specific implementation modes and the scope of application according to the concept of the present disclosure. From the above, the contents of the specification should not be understood as limits to the present disclosure.

The invention claimed is:

1. An antenna assembly, comprising:
   a first antenna structure, a second antenna structure and a third antenna structure, wherein the first antenna structure is used as a diversity antenna, the second antenna structure is in an idle state and the third antenna structure is used as a main antenna;
   a radio frequency module, coupled to each of the first antenna structure, the second antenna structure and the third antenna structure through a switch assembly; and
   the switch assembly, arranged to, according to signal quality of the first antenna structure, the second antenna structure and the third antenna structure, switch one of the first antenna structure or the second antenna structure to the main antenna, switch the other of the first antenna structure or the second antenna structure to the idle state, and switch the third antenna structure to the diversity antenna.

2. The antenna assembly of claim 1, wherein the switch assembly is arranged to, when the signal quality of the third antenna structure is less than a first preset threshold value, switch the first antenna structure or the second antenna structure to the main antenna and switch the third antenna structure to the diversity antenna.

3. The antenna assembly of claim 1, wherein the radio frequency module comprises a first port and a second port, the first port is arranged to transmit and receive signals and the second port is arranged to receive signals; and the switch assembly is arranged to, according to the signal quality of the first antenna structure, the second antenna structure and the third antenna structure, control the first port of the radio frequency module to be connected with the first antenna structure or the second antenna structure and control the second port of the radio frequency module to be connected with the third antenna structure.

4. The antenna assembly of claim 3, wherein the switch assembly comprises a first input port, a second input port, a first output port, a second output port and a third output port;
   the first input port is coupled to the first port of the radio frequency module and the second input port is coupled to the second port of the radio frequency module; and
   the first output port is coupled to the third antenna structure, the second output port is coupled to the first antenna structure and the third output port is coupled to the second antenna structure.

5. The antenna assembly of claim 4, wherein the switch assembly comprises a double-pole multi-throw switch, the first input port and the second input port are input terminals of the double-pole multi-throw switch, and the first output port, the second output port and the third output port are output terminals of the double-pole multi-throw switch.

6. The antenna assembly of claim 4, wherein the switch assembly comprises a first single-pole multi-throw switch and a second single-pole multi-throw switch, the first input port is an input terminal of the first single-pole multi-throw switch and the second input port is an input terminal of the second single-pole multi-throw switch, and the first output port, the second output port and the third output port comprise output terminals of the first single-pole multi-throw switch and output terminals of the second single-pole multi-throw switch.

7. The antenna assembly of claim 3, wherein the first port of the radio frequency module is coupled to the switch assembly through a power coupler;
   the power coupler is arranged to detect impedance matching characteristic of the first antenna structure; and
   the switch assembly is arranged to, when the impedance matching characteristic of the first antenna structure is less than a second preset threshold value, switch the first antenna structure to the idle state and switch the second antenna structure to the main antenna.

8. The antenna assembly of claim 3, further comprising:
   a Wireless Fidelity (WiFi) module, comprising a third port and a fourth port for transmitting and receiving WiFi signals; and
   a fourth antenna structure, coupled to the third port of the WiFi module, and for transmitting and receiving WiFi signals, wherein
   the switch assembly is further coupled to the fourth port of the WiFi module, and the switch assembly is arranged to control the fourth port of the WiFi module to be connected with one of the first antenna structure, the second antenna structure or the third antenna structure.

9. The antenna assembly of claim 8, wherein the fourth port of the WiFi module is coupled to the first input port of the switch assembly.

10. The antenna assembly of claim 3, further comprising:
    a satellite positioning module, comprising a fifth port and a sixth port, the fifth port being arranged to transmit and receive satellite positioning signals and the sixth port being arranged to receive satellite positioning signals; and a fourth antenna structure, coupled to the fifth port of the satellite positioning module, and for transmitting and receiving satellite positioning signals, wherein the switch assembly is further coupled to the sixth port of the satellite positioning module, and the switch assembly is arranged to control the sixth port of the satellite positioning module to be connected with one of the first antenna structure, the second antenna structure or the third antenna structure.

11. The antenna assembly of claim 1, further comprising an antenna carrier, wherein each of the first antenna structure, the second antenna structure and the third antenna structure is arranged on the antenna carrier.

12. The antenna assembly of claim 11, wherein a ground point is arranged on the antenna carrier, and each of the first antenna structure, the second antenna structure and the third antenna structure is connected with the ground point;

wherein the antenna carrier comprises a first end portion and a second end portion which are opposite to each other; and the first antenna structure and the second antenna structure are arranged at the first end portion of the antenna carrier and the third antenna structure is arranged at the second end portion of the antenna carrier.

13. The antenna assembly of claim 12, wherein the first end portion of the antenna carrier comprises a first side and second side which are opposite to each other, and the first antenna structure is arranged on the first side and the second antenna structure is arranged on the second side.

14. An electronic device, comprising a housing and an antenna assembly, wherein the antenna assembly is mounted in the housing, and the antenna assembly comprising:

a first antenna structure, configured as one of a main antenna, a diversity antenna or an idle state;

a second antenna structure, spaced apart from the first antenna structure, and configured as one of the main antenna, the diversity antenna or the idle state;

a power coupler, coupled to each of the first antenna structure and the second antenna structure, and configured to detect impedance matching characteristics of the first antenna structure and the second antenna structure; and a switch assembly, coupled to each of the power coupler, the first antenna structure and the second antenna structure, and configured to, according to the impedance matching characteristics of the first antenna structure and the second antenna structure, configure one of the first antenna structure or the second antenna structure as the main antenna, and configure the other of the first antenna structure or the second antenna structure as the diversity antenna or the idle state.

15. The electronic device of claim 14, wherein the switch assembly is further configured to, when the first antenna structure is configured as the main antenna and the second antenna structure is configured as the diversity antenna or the idle state, and when the impedance matching characteristic of the first antenna structure is less than a first preset threshold, configure the first antenna structure as the diversity antenna or the idle state and configure the second antenna structure as the main antenna;

and configured to, when the first antenna structure is configured as the diversity antenna or the idle state and the second antenna structure is configured as the main antenna, and when the impedance matching characteristic of the second antenna structure is less than the first preset threshold, configure the first antenna structure as the main antenna and configure the second antenna structure as the diversity antenna or the idle state.

16. The electronic device of claim 14, the antenna assembly further comprising:

a third antenna structure, spaced apart from the first antenna structure and the second antenna structure, configured as one of the main antenna or the diversity antenna, and coupled to the switch assembly; and wherein the switch assembly is further configured to, when the first antenna structure is configured as the main antenna and the third antenna structure is configured as the diversity antenna, and when signal quality of the first antenna structure is less than a second preset threshold, configure the first antenna structure as the diversity antenna and configure the third antenna structure as the main antenna;

and configured to, when the second antenna structure is configured as the main antenna and the third antenna structure is configured as the diversity antenna, and when signal quality of the second antenna structure is less than the second preset threshold, configure the second antenna structure as the diversity antenna and configure the third antenna structure as the main antenna.

17. A method for switching an antenna, the method being applied to an electronic device, wherein the electronic device comprises an antenna assembly, the antenna assembly comprises a first antenna structure, a second antenna structure, a power coupler and a switch assembly, and the method comprising:

detecting impedance matching characteristics of the first antenna structure and the second antenna structure; and according to the impedance matching characteristics of the first antenna structure and the second antenna structure, configuring one of the first antenna structure or the second antenna structure as a main antenna, and configuring the other of the first antenna structure or the second antenna structure as a diversity antenna or an idle state.

18. The method of claim 17, further comprising:

when the first antenna structure is configured as the main antenna and the second antenna structure is configured as the diversity antenna or the idle state, and when the impedance matching characteristic of the first antenna structure is less than a first preset threshold, configuring the first antenna structure as the diversity antenna or the idle state and configuring the second antenna structure as the main antenna; and when the first antenna structure is configured as the diversity antenna or the idle state and the second antenna structure is configured as the main antenna, and when the impedance matching characteristic of the second antenna structure is less than the first preset threshold, configuring the first antenna structure as the main antenna and configuring the second antenna structure as the diversity antenna or the idle state.

19. The method of claim 17, wherein the electronic device further comprises a third antenna structure, and the method further comprising:

when the first antenna structure is configured as the main antenna the third antenna structure is configured as the diversity antenna, and when signal quality of the first antenna structure is less than a second preset threshold, configuring the first antenna structure as the diversity antenna and configuring the third antenna structure as the main antenna; and when the second antenna structure is configured as the main antenna and the third antenna structure is configured as the diversity antenna, and when signal quality of the second antenna structure is less than the second preset threshold, configuring the second antenna structure as the diversity antenna and configuring the third antenna structure as the main antenna.

20. The method of claim 17, wherein the electronic device further comprises a radio frequency module, a third antenna structure and a fourth antenna structure, and the fourth antenna structure is configured to transmit and receive at least one of Global Positioning System (GPS) signals or short-range communication signals, and the method further comprising:

acquiring working state information of the radio frequency module;

when the working state information of the radio frequency module is the idle state, acquiring signal quality values of the first antenna structure, the second antenna structure and the third antenna structure; and selecting as a target antenna structure one of the first antenna structure, the second antenna structure or the third antenna structure which has a maximum signal quality value, and determining the target antenna structure as an opportunistic diversity antenna matched with the fourth antenna structure.

* * * * *